(12) United States Patent
Ito et al.

(10) Patent No.: US 7,482,765 B2
(45) Date of Patent: Jan. 27, 2009

(54) LIGHTING CONTROL APPARATUS OF LIGHTING DEVICE FOR VEHICLE

(75) Inventors: Masayasu Ito, Shizuoka (JP); Fuminori Shiotsu, Shizuoka (JP); Takanori Namba, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 203 days.

(21) Appl. No.: 11/484,989

(22) Filed: Jul. 11, 2006

(65) Prior Publication Data
US 2007/0013321 A1    Jan. 18, 2007

(30) Foreign Application Priority Data
Jul. 12, 2005    (JP) ............................ P.2005-202433

(51) Int. Cl.
    *H05B 37/00*    (2006.01)
(52) U.S. Cl. .................. 315/312; 315/291; 315/224; 315/307; 315/82; 323/224; 323/276; 323/277; 307/10.8
(58) Field of Classification Search .................. 315/77, 315/82, 291, 307, 312, 224, 247, 276, 282, 315/360; 307/10.1, 10.8; 323/222, 228, 323/224, 276, 277; 327/177, 180, 514, 515, 327/540
    See application file for complete search history.

(56) References Cited

U.S. PATENT DOCUMENTS

| 6,577,072 B2 * | 6/2003 | Saito et al. ............... 315/185 R |
| 6,617,808 B2 * | 9/2003 | Ito et al. ..................... 315/291 |
| 7,015,654 B1 * | 3/2006 | Kuhlmann et al. .......... 315/291 |
| 7,084,571 B2 * | 8/2006 | Ito et al. ....................... 315/82 |
| 7,291,989 B2 * | 11/2007 | Namba et al. ............... 315/291 |
| 7,327,051 B2 * | 2/2008 | Ito et al. .................... 307/10.8 |

FOREIGN PATENT DOCUMENTS

| DE | 199 50 135 A1 | 4/2001 |
| DE | 102 36 862 A1 | 3/2004 |
| DE | 103 46 528 A1 | 4/2004 |
| DE | 10 2005 047 610 A1 | 4/2006 |
| EP | 1 079 667 A2 | 2/2001 |
| JP | 2004-134147 | 4/2004 |

* cited by examiner

*Primary Examiner*—Haissa Philogene
(74) *Attorney, Agent, or Firm*—Fish & Richardson P.C.

(57) ABSTRACT

When a forward direction voltage of any of several LEDs 14 to 20 is lowered, a drain voltage of an NMOS transistor 70 employed in any of series regulators 24 to 30 becomes higher than a defined voltage. A zener diode ZD1, which is connected to the LED where the abnormal condition occurs, becomes conductive. A voltage, which is increased from the defined voltage, is applied to a negative input terminal of a comparing amplifier 72, and an output voltage of the comparing amplifier 72 is lowered by this increased voltage portion so that a gate voltage of the NMOS transistor 70 is lowered. A current flowing through the NMOS transistor 70 is decreased. Even if an abnormal condition caused by a voltage drop occurs in any of the LEDs 14 to 20, then the LEDs 14 to 20 can be protected.

8 Claims, 6 Drawing Sheets

LIGHTING CONTROL APPARATUS OF LIGHTING DEVICE FOR VEHICLE

This application claims the priority of Japanese application No. 2005-202433 filed in Jul. 12, 2005, the disclosure of which is incorporated herein by reference.

TECHNICAL FIELD

The present disclosure generally relates to a lighting control apparatus of a lighting device for a vehicle. More specifically, the present disclosure is directed to a lighting control apparatus of a lighting device for a vehicle, which is arranged to control lighting operation of a semiconductor light source that includes a semiconductor light emitting element.

BACKGROUND

Conventionally, light sources are known in which semiconductor light emitting elements such as LEDs (Light Emitting Diodes) are employed as lighting devices for vehicles. In this sort of vehicle-purpose lighting devices, a control apparatus for controlling lighting operations of the LEDs is mounted.

Lighting control apparatus equipped with switching regulators are known. The switching regulators are capable of controlling output voltages with respect to LEDs based upon currents of the LEDs. Even when multiple LEDs are connected as a load either in series manner or in parallel, the switching regulators can control output voltages so that specified currents may flow through the respective LEDs.

However, if outputs of the switching regulators are short-circuited, or grounded, then the loads of the switching regulators are increased. As a result, there is the possibility that the switching regulators will malfunction in combination with excessively heavy power loads. Also, when the outputs of the switching regulators are brought into open statuses due to disconnections of LEDs, for instance, in a flyback-type switching regulator, the output voltage can be increased excessively.

Under such a circumstance, it has been proposed to lower an output voltage of the switching regulator when an abnormal condition is detected on the output side of a switching regulator is detected (see, e.g., Japanese patent document JP-A-2004-134147, in particular FIG. 1, FIG. 6, and FIG. 7, pages 3 to 8).).

In the foregoing conventional technique, multiple LED blocks are connected in parallel to the output side of the switching regulator. A series regulator, which contains a switch element, a shunt resistor, and a comparator, is connected in series to each of the LED blocks. The output voltage of the switching regulator is controlled so that the current of each of the LED blocks constitutes a defined current. When an abnormal condition occurs, the output voltage of the switching regulator is lowered. As a result, even if some of the LEDs malfunction, the sound LEDs can be protected. However, the foregoing conventional technique does not address detection of an abnormal condition with respect to each of the LED blocks.

SUMMARY

The present disclosure addresses the problems of the foregoing conventional technique. One aspect of the invention relates to a lighting control apparatus of a vehicle-purpose lighting device that includes a stage for supplying electromagnetic energy with respect to a plurality of semiconductor light sources connected in parallel to each other. When an abnormal condition occurs in a circuit connected to each of the semiconductor light sources, or when an abnormal condition occurs in any of the semiconductor light sources, the sound semiconductor light source can be protected.

A first aspect of the invention relates to a lighting control apparatus of a vehicle-purpose lighting device in which a plurality of semiconductor light sources connected in parallel to each other are employed as a load. The control apparatus includes a switching regulator for applying an input voltage from a power supply to the respective semiconductor light sources, and a plurality of series regulators which are connected in series to the respective semiconductor light sources. The control apparatus also includes protection control means for performing a protection control operation with respect to the respective series regulators in response to an abnormal condition caused by a disconnection as to each of the semiconductor light sources, or an abnormal condition caused by disconnection of a circuit coupled to each of the semiconductor light sources. Each of the series regulators can be implemented by a current detecting element for detecting a current of each of the semiconductor light sources. The control apparatus further includes a switch element connected in series to each of the semiconductor light sources, and a comparator for comparing a current detected by the current detecting element with a defined value and for controlling ON/OFF operations of the switch element in response to a comparison result. The switching regulator controls an output voltage in response to a comparison result of any of the comparators. If the detected current of each of the current detecting elements is lowered so that a comparison result of the comparator becomes abnormal, each of the protection control means turns OFF the switch element and maintains the OFF operation of the switch element.

The respective series regulators are controlled so that defined currents may flow through the plurality of semiconductor light sources connected in parallel to each other. Also, the output voltage of the switching regulator is controlled in response to a control condition of any of the series regulators (for instance, when an abnormal condition occurs which is related to a disconnection (open circuit) of any of the semiconductor light sources, or any circuit coupled to the semiconductor light sources). If a comparison result of the comparator becomes abnormal such that a current of a current detecting element connected to the semiconductor light source where the abnormal condition occurs is lowered (for instance, the output of the comparator becomes higher than the normal value), then the switch element is turned OFF and the OFF operation of the switch element is maintained by operation of the protection control means, so that the series regulator connected to the semiconductor light source where the abnormal condition occurs can be kept in the OFF state As a result, even when the abnormal condition occurs due to the disconnection of either the semiconductor light sources or the circuit coupled to the semiconductor light sources, the sound semiconductor light source can be protected.

A second aspect relates to a lighting control apparatus of a vehicle-purpose lighting device in which a plurality of semiconductor light sources connected in parallel to each other are employed as a load. The control apparatus includes a switching regulator for applying an input voltage from a power supply to the respective semiconductor light sources, and a plurality of series regulators are connected in series to the respective semiconductor light sources. The control apparatus also includes witching regulator control means for performing a control operation with respect to the switching regulator in response to an abnormal operation which is caused by a grounding failure of each of the semiconductor light sources. Each of the series regulators is implemented by a current detecting element for detecting a current of each of the semiconductor light sources, a switch element series-connected to each of the semiconductor light sources, and a comparator for comparing a current detected by the current detecting element with a defined value and for controlling ON/OFF operations of the switch element in response to a comparison result. The switching regulator controls an output voltage in response to a comparison result of any of the comparators. The switching regulator control means stops the operation of the switching regulator under if an output voltage of the switching regulator is under normal condition when the detected current of each of the current detecting elements is lowered so that a comparison result of the comparator becomes abnormal.

The respective series regulators are controlled so that defined currents may flow through the plurality of semiconductor light source connected in parallel to each other, and the output voltage of the switching regulator is controlled in response to a control condition of any of the series regulators (for instance, when an abnormal condition occurs which is related to a grounding failure of any of the semiconductor light sources). If a comparison result of the comparator becomes abnormal such that a detected current of a current detecting element belonging to the series regulator which is connected to the semiconductor light source where the abnormal condition occurs is lowered (for instance, the output of the comparator becomes higher than the normal value) then the operation of the switching regulator is stopped under such a condition that the output voltage of the switching regulator is under normal condition. As a result, even if the abnormal condition is caused by the grounding failure of the semiconductor light source, the operation of the switching regulator is stopped, so that the sound semiconductor light source can be protected.

A third aspect relates to a lighting control apparatus of a vehicle-purpose lighting device in which a plurality of semiconductor light sources connected in parallel to each other are employed as a load. The control apparatus includes a switching regulator for applying an input voltage from a power supply to the respective semiconductor light sources, and a plurality of series regulators which are connected in series to the respective semiconductor light sources. The control apparatus also includes a plurality of voltage drop detecting means for detecting whether applied voltages of the respective switch elements are increased higher than a defined voltage in conjunction with voltage drops of the respective semiconductor light sources. Each of the series regulators is implemented by a current detecting element for detecting a current of each of the semiconductor light sources, a switch element connected in series to each of the semiconductor light sources, and a comparator for comparing a current detected by the current detecting element with a defined value and for controlling ON/OFF operations of the switch element in response to a comparison result. The switching regulator controls an output voltage in response to a comparison result of any of the comparators. When a detected output of each of the voltage drop detecting means is added to the detected current of each of the current detecting elements, each of the comparators lowers a current of the switch element in response to an increased portion.

The respective series regulators are controlled so that defined currents may flow through the plurality of semiconductor light source connected in parallel to each other, and the output voltage of the switching regulator is controlled in response to a control condition of any of the series regulators (for instance, when it is detected that an applied voltage of a switch element is increased higher than the defined voltage in conjunction with a voltage drop of any of the semiconductor light sources). If the forward direction voltage of the semiconductor light source is lowered, or both the terminals of the semiconductor light source are short-circuited, a current is added to the detected current of the current detecting element, which corresponds to an increased portion of the applied voltage to the switch element connected to the semiconductor light source where the voltage drop occurs. As a result, the output of the comparator is changed so that the current of the switch element is lowered in response to the increased portion of the detected current of the current detecting element. Thus, even when an abnormal condition occurs in the semiconductor light source in conjunction with the voltage drop, the semiconductor light source can be protected. Further, the semiconductor light source where the abnormal condition occurs can be maintained in beam-attenuated lighting status. Thus, this can contribute to an improvement in safety characteristics.

A fourth aspect relates to a lighting control apparatus of a vehicle-purpose lighting device in which a plurality of semiconductor light sources connected parallel to each other are employed as a load. The control apparatus includes a switching regulator for applying an input voltage from a power supply to the respective semiconductor light sources, and a plurality of series regulators which are connected in series to the respective semiconductor light sources. The control apparatus further includes protection control means for performing a protection control operation with respect to the respective series regulators in response to an abnormal condition caused by a disconnection as to each of the semiconductor light sources, or a circuit coupled to each of the semiconductor light sources. The apparatus also includes switching regulator control means for performing a control operation with respect to the switching regulator in response to an abnormal operation which is caused by a grounding failure of each of the semiconductor light sources. Each of the series regulators is implemented by a current detecting element for detecting a current of each of the semiconductor light sources, a switch element series-connected to each of the semiconductor light sources, and a comparator for comparing a current detected by the current detecting element with a defined value and for controlling ON/OFF operations of the switch element in response to a comparison result. The switching regulator controls an output voltage in response to a comparison result of any of the comparators. Each of the protection control means turns OFF the switch element and maintains the OFF operation of the switch element if the time frame during which the comparison result of the comparator becomes abnormal in conjunction with lowering of the detected current of each of the current detecting elements has exceeded a first time. The switching regulator control means stops the operation of the switching regulator under such a condition that an output voltage of the switching regulator is under normal condition when a time frame during which the comparison result of the comparator becomes abnormal in conjunction with lowering of the detected current of each of the current detecting elements has exceeded a second time which is shorter than the first time.

The respective series regulators are controlled so that defined currents may flow through the plurality of semiconductor light source connected parallel to each other, and the output voltage of the switching regulator is controlled in response to a control condition of any of the series regulators (for instance, when an abnormal condition occurs which is related to a disconnection (open circuit) of any of the semiconductor light sources, or any circuit coupled to the semiconductor light sources). If a comparison result of the comparator becomes abnormal in conjunction such that a current of a current detecting element connected to the semiconductor light source where the abnormal condition occurs is lowered (for instance, if the time frame during which the output of the comparator becomes higher than the normal value has exceeded the first time), the switch element is turned OFF, and the OFF operation of the switch element is maintained by the operation of the protection control means, so that the series regulator connected to the semiconductor light source where the abnormal condition occurs can be kept in the OFF state. As a result, even when the abnormal condition occurs due to the disconnection of either the semiconductor light sources or the circuit coupled to the semiconductor light sources, the sound semiconductor light source can be protected.

Also, if an abnormal condition happens to occur in conjunction with a grounding failure of any of the semiconductor light sources, and the comparison result of the comparator becomes abnormal in conjunction with an operation such that a detected current of a current detecting element belonging to the series regulator which is connected to the semiconductor light source where the abnormal condition occurs is lowered (for example, if the time frame during which the output of the comparator becomes higher than the normal value has exceeded the second time which is shorter than the first time), then the operation of the switching regulator is stopped such that the output voltage of the switching regulator is in normal condition. As a result, if the abnormal condition is caused by the grounding failure of the semiconductor light source, the operation of the switching regulator is stopped faster than that when the abnormal condition occurs due to the disconnections in the semiconductor light sources, or the circuits coupled to the semiconductor light sources. As a consequence, the sound semiconductor light source can be protected.

In some implementations of any of the foregoing control apparatus, the switching regulator stores the input voltage of the power supply into a transformer as electromagnetic energy when a main switch is turned ON, or OFF, and discharges the electromagnetic energy stored in the transformer from a secondary side of the transformer to each of the semiconductor light sources when the main switch is turned ON, or OFF. If the transformer is equipped with a plurality of secondary windings, a ratio of turn numbers of the secondary windings can be set to correspond to a ratio of voltage drops of semiconductor light sources which are connected to the respective secondary windings.

Since the ratio of the turn numbers of the secondary windings is set to correspond to the ratio of the voltage drops of the semiconductor light sources which are connected to the respective secondary windings, even if a total number of the semiconductor light sources and voltage drops (forward direction voltage) of the semiconductor light sources (which are connected to the respective series regulators) are different from each other, losses (power losses) in the respective series regulators can be reduced.

One or more of the following advantages may be present in some implementations. For example, according to the first aspect, even when the abnormal condition occurs due to the disconnection of either the semiconductor light sources or the circuit coupled to the semiconductor light sources, the sound semiconductor light source can be protected.

According to the second aspect, even if the abnormal condition is caused by the grounding failure of the semiconductor light source, the sound semiconductor light source can be protected.

Similarly, according to the third aspect, even when the abnormal condition occurs in the semiconductor light source in conjunction with the voltage drop, the semiconductor light source can be protected. Furthermore, the semiconductor light source where the abnormal condition occurs can be maintained in a beam-attenuated lighting status. That can contribute to an improvement in safety characteristics.

According to the fourth aspect, even when the abnormal condition occurs due to the disconnection of either the semiconductor light sources or the circuit coupled to the semiconductor light sources, the sound semiconductor light source can be protected. Also, when the abnormal condition is caused by the grounding failure of the semiconductor light source, the protecting operation can be faster than that when the abnormal condition occurs due to the disconnections in the semiconductor light sources, or the circuits coupled to the semiconductor light sources. Therefore, the sound semiconductor light source can be protected.

In some cases, even in if the total number of semiconductor light sources and voltage drops (forward direction voltage) of the semiconductor light sources (which are connected to the respective series regulators) are different from each other, losses (power losses) in the respective series regulators can be reduced.

BEST MODE FOR CARRYING OUT THE INVENTION

Next, examples of the present invention are explained.

Figure 1:
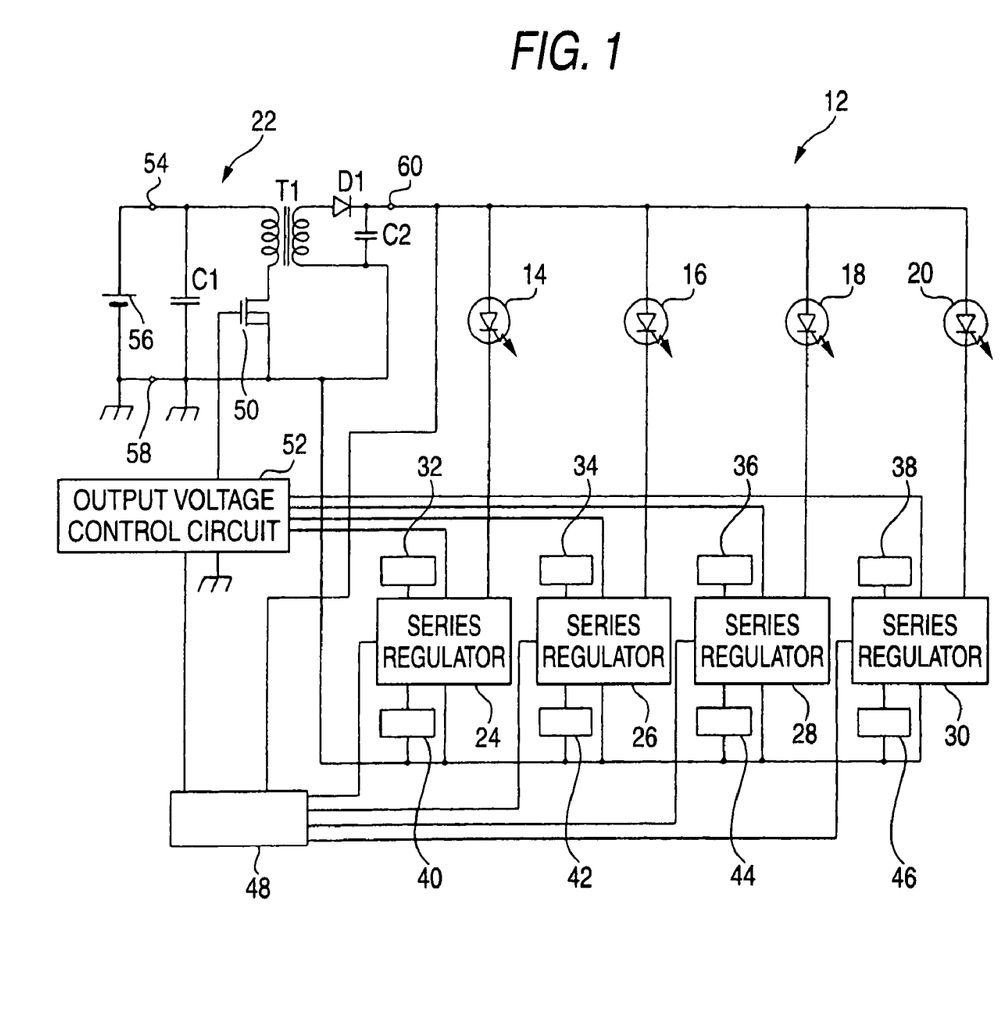
FIG. 1 is a circuit arrangement diagram for a lighting control apparatus of a vehicle-purpose lighting device according to a first embodiment of the present invention.

In the drawings, a lighting control apparatus 12 of a vehicle-purpose lighting device is implemented with the following components: a switching regulator 22; four series regulators 24, 26, 28, 30; four voltage drop detecting circuits 32, 34, 36, 38; four protection control circuits 40, 42, 44, 46; and a switching regulator control circuit 48 with respect to four LEDs 14, 16, 18, and 20.

The LEDs 14, 16, 18, 20 are connected in parallel to each other, and are connected in series to the respective series regulators 14, 16, 18, 20 on the output side of the switching regulator 22 as a semiconductor light source implemented by the semiconductor light emitting elements.

Alternatively, the LEDs 14, 16, 18, and 20, can be connected in series to each. Also, the respective LEDs 14, 16, 18, and 20 may be arranged as light sources for various sorts of vehicle-purpose lighting devices such as a head lamp, a stop lamp and a tail lamp, a fog lamp, a turn signal lamp, and the like.

The switching regulator 22 is implemented by capacitors C1 and C2, a transformer T1, a diode D1, an NMOS transistor 50, and an output voltage control circuit 52. The capacitor C1 is connected in parallel to a primary side of the transformer T1, and one terminal side of the capacitor C1 is connected via a power supply input terminal 54 to a positive (plus) terminal of an on-vehicle battery (DC power supply) 56. The other terminal of the capacitor C1 is connected via another power supply input terminal 58 to a negative (minus) terminal of the on-vehicle battery 56 and also is grounded. The NMOS transistor 50 is connected in series to the primary side of the transformer T1, the drain of which is connected to a primary winding thereof. The source of the transistor 50 is grounded, and its gate is connected to the output voltage control circuit 52. The capacitor C2 is connected via the diode D1 to a secondary side of the transformer T1 in parallel. A junction point between the diode D1 and the capacitor C2 is connected to an output terminal 60, an the output terminal 60 is connected to the anodes of the LEDs 14, 16, 18, 20.

The NMOS transistor 50 is arranged as a main switch which is turned ON/OFF in response to ON/OFF signals (switching signal) from the output voltage control circuit 52. When the NMOS transistor 50 is turned ON, an input voltage from the NMOS transistor 50 is stored in the transformer T1 as electromagnetic energy. When the NMOS transistor 50 is turned OFF, the electromagnetic energy stored in the transformer T1 is discharged from the secondary side of the transformer T1 via the diode D1 to the respective LEDs 14, 16, 18, 20. In this case, the switching regulator 22 controls the output voltage to become a maximum voltage so that this output voltage may be coincident with the highest voltage among the voltages which are fed back from the series regulators 24, 26, 28, 30 to the output voltage control circuit 52.

Figure 2:
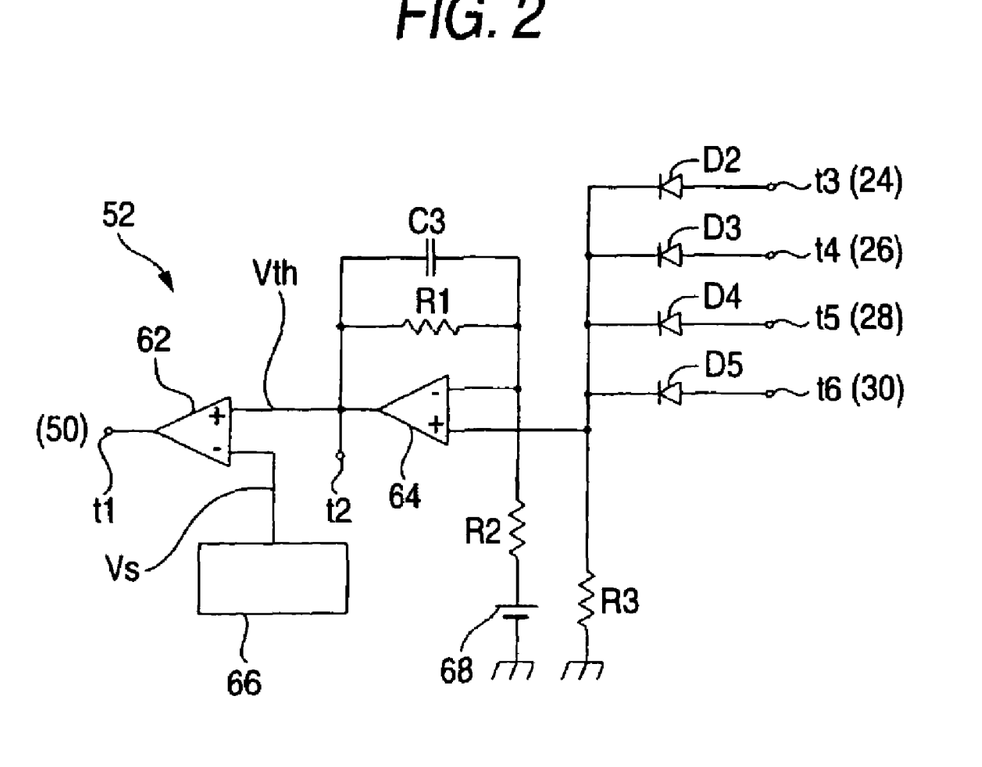
FIG. 2 is a circuit arrangement diagram of an output voltage control circuit.

As represented in FIG. 2, the output voltage control circuit 52 is implemented by a comparator 62, an error amplifier 64, a saw-tooth wave generator 66, a reference voltage 68, resistors R1, R2, R3, a capacitor C3, and diodes D2, D3, D4, D5. An output terminal t1 of the comparator 62 is connected to the gate of the NMOS transistor 50; an output terminal t2 of the error amplifier 64 is connected to the switching regulator control circuit 48; and input terminals t3 to t6 connected to anodes of the diodes D2 to D5 are connected to the series regulators 24, 26, 28, 30.

The error amplifier 64 acquires voltages which are fed back from the series regulators 24, 26, 28, 30 via the diodes D2 to D5 to the positive input terminal thereof, and sets such a voltage as a threshold value "Vth," which corresponds to a difference between a reference voltage 68 and a maximum voltage among the acquired voltages. The error amplifier 64 then outputs this threshold value Vth to the positive input terminal of the comparator 62. The comparator 62 acquires a saw-tooth wave (saw-tooth wave signal) "Vs" from the saw-tooth wave generator 66, compares the acquired saw-tooth wave Vs with the threshold value Vth, and then provides ON/OFF signals (switching signal), in response to a comparison result, to the gate of the NMOS transistor 50. At this time, the ON/OFF signals may be provided via a preamplifier (not shown).

Figure 3:
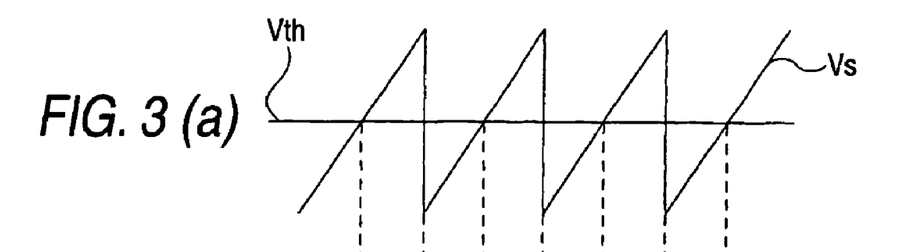
FIG. 3 is a waveform diagram for explaining operations of the output voltage control circuit.

As shown in FIG. 3(a) and FIG. 3(b), when the level of the threshold value Vth is at a substantially intermediate level of the saw-tooth wave Vs, the comparator 62 provides an ON/OFF signal having an ON duty of 50%. In this case, when any one of the output voltages fed back from the series regulators 24, 26, 28, 30 becomes high, and the level of the threshold value Vth becomes high, as shown in FIG. 3(c) and FIG. 3(d), the comparator 62 provides an ON/OFF signal having a higher ON duty than the ON duty of 50%. Conversely, when the voltages fed back from the series regulators 24, 26, 28, 30 become low and the level of the threshold value Vth is lowered, as shown in FIG. 3(e) and FIG. 3(f), the comparator 62 provides an ON/OFF signal having an ON duty lower than 50%. Instead of the saw-toothwave generator 66, a triangular wave generator for generating a triangular wave signal may be employed.

Figure 4:
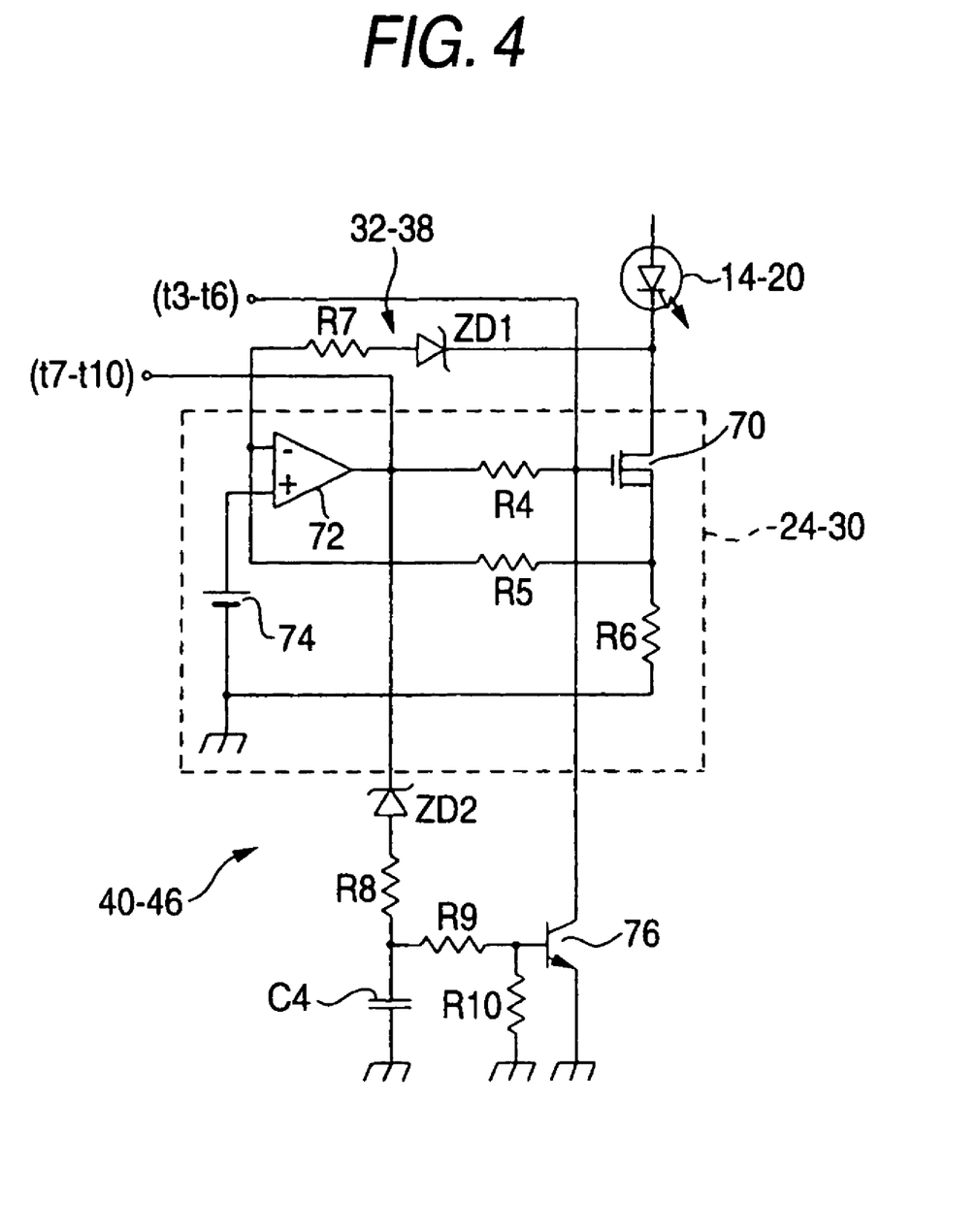
FIG. 4 is a circuit arrangement as to a series regulator, a voltage drop detecting circuit, and a protection control circuit.

As shown in FIG. 4, each of the series regulators 24, 26, 28, 30 is implemented by an NMOS transistor 70, a comparing amplifier 72, a reference voltage 74, and resistors R4, R5, R6. A drain of the NMOS transistor 70 is connected to cathodes of the LEDs 14 to 20, and is connected in series to the LEDs 14 to 20 in combination with the resistor R6. The resistor R6 serves as a current detecting element which detects currents flowing through the respective LEDs 14 to 20. A voltage appearing between both terminals of the resistor R6 is applied via the resistor R5 to a negative input terminal of the comparing amplifier 72. The comparing amplifier 72 compares a voltage which is applied to the negative input terminal with the reference voltage 74 as the determined value, and applies a voltage corresponding to the comparison result via the resistor R4 to the gate of the NMOS transistor 70 so as to control ON/OFF operations of the NMOS transistor 70. In other words, the comparing amplifier 72 compares the voltage appearing between both the terminals of the resistor R6 with the reference voltage 74, and controls the ON/OFF operations of the NMOS transistor 70 in accordance with this comparison result so that the determined current may flow through the NMOS transistor 70. ON/OFF statuses of the respective NMOS transistors 70 are fed back to the input terminals t3 to t6 of the output voltage control circuit 52 by the gate voltages thereof.

As shown in FIG. 4, voltage drop detecting circuits 32 to 38 and protection control circuits 40 to 46 are connected to the respective series regulators 24 to 30. Each of the voltage drop detecting circuits 32 to 38 is implemented by a resistor R7 and a zener diode ZD1. The resistor R7 is connected in series to the zener diode ZD1. One terminal side of the resistor R7 is connected to the negative input terminal of the comparing amplifier 72, and a cathode of the zener diode ZD1 is connected to the drain of the NMOS transistor 70.

The respective voltage drop detecting circuits 32 to 38 are implemented as voltage drop detecting means capable of detecting abnormal conditions caused by the voltage drops of the LEDs 14 to 20. For instance, the voltage drop detecting means is capable of detecting that, in conjunction with lowering of forward direction voltages "Vf" of the LEDs 14 to 20, the drain voltage corresponding to the applied voltage of the NMOS transistor 70 has increased from a predetermined voltage to higher than the predetermined voltage. When the drain voltage of the NMOS transistor 70 becomes higher than the predetermined voltage, the zener diode ZD1 conducts, and a voltage which is increased from the determined voltage is applied to the negative input terminal of the comparing amplifier 72. When the drain voltage of the NMOS transistor 70 becomes higher than the predetermined voltage, the output of the comparing amplifier 72 is lowered, and in conjunction with lowering of the gate voltage of the NMOS transistor 70, the current flowing through the NMOS transistor 70 can be reduced (lowered). In other words, when the drain voltage of the NMOS transistor 70 becomes higher than the predetermined voltage, the output of the comparing amplifier 72 is decreased so that the current of the NMOS transistor 70 is lowered in response to an increased voltage portion of the voltage applied to the negative input terminal. In this case, the current flowing through the NMOS transistor 70 may be lowered in a linear mode by adjusting a resistance ratio between the resistor R5 and the resistor R7.

As shown in FIG. 4, each of the protection control circuits 40 to 46 is implemented by a zener diode ZD2, resistors R8, R9, R10, a capacitor C4, and an NPN transistor 76. A cathode of the zener diode ZD2 is connected to the output side of the comparing amplifier 72, and a collector of the NPN transistor 76 is connected to the gate of the NMOS transistor 70. A time constant determined by the resistor R8 and the capacitor C4 is set as a first time which defines a rising time of the NPN transistor 76.

The respective protection circuits 40 to 46 are implemented as protection control means which perform protection control operations with respect to the series regulators 24 to 30 in response to an abnormal condition in relation to disconnections (open circuits) of circuits as to either the LEDs 14 to 20 or circuits coupled to these LEDs 14 to 20.

If the abnormal condition related to the disconnections of either the LEDs 14 to 20 or the circuits coupled to these LEDs 14 to 20 occurs, no current flows through the resistor R6, so that an output voltage of the comparing amplifier 72 becomes higher than the defined voltage. When the output voltage of the comparing amplifier 72 becomes higher than the defined voltage, the zener diode ZD2 becomes conductive, so that the capacitor C4 is charged. If a voltage between both the terminals of the capacitor C4 exceeds a threshold value of the NPN transistor 76 such that the capacitor C4 is charged in accordance with the time constant determined based upon the capacitor C4 and the resistor R8, then it is assumed that the time during which the abnormal condition caused by the disconnection occurs exceeds a first time, the NPN transistor 76 is turned ON, and the gate of the NMOS transistor 70 is turned OFF. As a result, the output of the comparing amplifier 72 is held at a high level, and the gate of the NMOS transistor 70 is held at a low level, so that the NMOS transistor 70 is maintained in the OFF state. In this case, only such a NMOS transistor 70 which is connected to the LED where the abnormal condition occurs is kept in the OFF state, and such an NMOS transistor 70 which is connected to a sound LED is kept in the ON state, so that the sound LED can be protected, while the protection control operation by the switching regulator 22 is not carried out.

Figure 5:
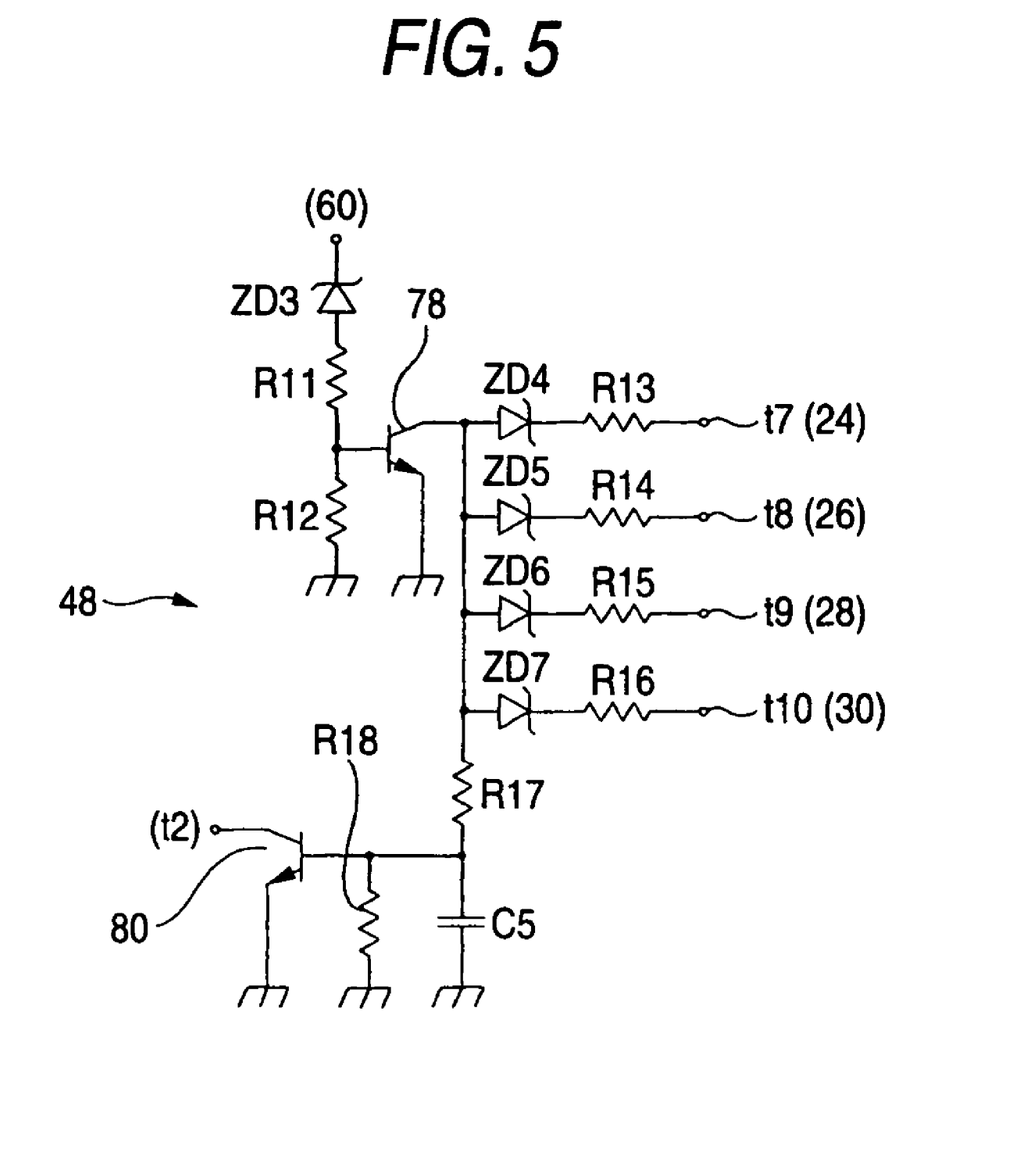
FIG. 5 is a circuit arrangement diagram of a switching regulator control circuit.

On the other hand, as shown in FIG. 5, the switching regulator control circuit 48 is implemented by NPN transistors 78 and 80, zener diodes ZD3, ZD4, ZD5, ZD6, and ZD7, resistors R11, R12, R13, R14, R15, R16, R17, and R18, and a capacitor C5. A cathode of the zener diode ZD3 is connected to an output terminal 60 of the switching regulator 22, a collector of the NPN transistor 80 is connected to an output terminal t2 of the output voltage control circuit 52, and the zener diodes ZD4, ZD5, ZD6, and ZD7 are connected via the resistor R17 to a base of the NPN transistor 80 to determine (in a binary manner) whether or not a cathode side of any one of the LEDs 14 to 20 is grounded. Input terminals t7 to t10 connected to the cathodes of the respective zener diodes ZD4 to ZD7 are connected to the output sides of the comparing amplifiers 72 in the respective series regulators 24 to 30. The resistor R18 and the capacitor C5 have a time constant which defines a second time corresponding to a rising operation time of the NPN transistor 80, whereas the second time is set to a shorter time than the first time that is set to the protection control circuits 40 to 46. In other words, the second time is set to be shorter than the first time so that a protection control operation with respect to an abnormal condition caused by a grounding failure can be carried out faster than a protection control operation with respect to an abnormal condition caused by a disconnection failure of the LEDs 14 to 20.

If the cathode side of any one of the LEDs 14 to 20 is grounded, then the output voltage of the switching regulator 22 is clamped to the forward direction voltage Vf of the LED whose cathode side is grounded. When an abnormal condition occurs in connection with the grounding failure of any one of the LEDs, no current flows through the NMOS transistor 70 connected to the LED of the grounded portion. As the voltage appearing between both the terminals of the resistor R6 is lowered, an output voltage of the comparing amplifier 72 becomes higher than the defined voltage. When the output voltage of the comparing amplifier 72 belonging to any one of the series regulators 24 to 30 becomes higher than the defined voltage, the corresponding one of the zener diodes ZD4 to ZD7, which is connected to the LED whose cathode side is grounded, becomes conductive.

At this time, the NPN transistor 78 is turned ON under such a condition that the output voltage of the switching regulator 22 is in normal condition. Namely, the output voltage of the switching regulator 22 is clamped to the forward direction voltage Vf of the LED whose cathode side is grounded, and the capacitor C5 is charged via a particular one of the zener diodes ZD4 to ZD7 which becomes conductive such that the zener diode ZD3 is under non-conductive status and the NPN transistor 78 is turned OFF. When a voltage between both the terminals of the capacitor C5 exceeds the threshold value of the NPN transistor 80 (assuming now that the time frame during which the abnormal condition caused by the grounding failure occurs exceeds the second time), the NPN transistor 80 is turned ON, and the output terminal of the error amplifier 64 of the output voltage control circuit 52 is grounded via the output terminal t2 and the NPN transistor 80, so that the operation of the switching regulator 22 is immediately stopped.

When the drain voltage of the NMOS transistor 70 as to any one of the series regulators 24 to 30 becomes higher than the defined voltage (assuming now that the forward direction voltage of any one of the LEDs 14 to 20 is lowered, or both the terminals of any one of these LEDs 14 to 20 are short-circuited), the zener diode ZD1 connected to the LED where the abnormal condition occurs becomes conductive; the voltage higher than the defined voltage is applied to the negative input terminal of the comparing amplifier 72; the output voltage of the comparing amplifier 72 is decreased by this higher voltage, so that the gate voltage of the NMOS transistor 70 is lowered, and the current flowing through the NMOS transistor 70 is decreased. As a result, even when the abnormal condition is caused by the voltage drop produced in any of the LEDs 14 to 20, the LEDs 14 to 20 can be protected. Furthermore, the LED where the abnormal condition occurs can be maintained in a beam-attenuated lighting condition, which can contribute to an improvement in safety characteristics.

When the abnormal condition is caused by the disconnection of the LEDs 14 to 20, or the circuits coupled to these LEDs 14 to 20, the output voltage of the comparing amplifier 72 in any one of the series regulators 24 to 30 becomes higher than the defined voltage, so that the zener diode ZD2 becomes conductive, and the capacitor C4 is charged. Then, when the voltage across both the terminals of this capacitor C4 exceeds the threshold value of the NPN transistor 76, if the time frame during which the abnormal condition caused by the disconnection exceeds the first time, the NPN transistor 76 is turned ON; the gate of the NMOS transistor 70 is grounded via the NPN transistor 76; only the NMOS transistor 70 connected to the LED where the abnormal condition occurs is maintained in the OFF state; and the NMOS transistor 70 connected to the sound LED is kept in the ON state. As a result, while the protection control operation by the switching regulator 22 is not carried out, the sound LED can be protected.

Furthermore, when the cathode side of any of the LEDs 14 to 20 is grounded, the output voltage of the switching regulator 22 is clamped to the forward direction voltage Vf of the LED whose cathode side is grounded; no current flows through the NMOS transistor 70 which is connected to the LED whose cathode side is grounded; the voltage appearing between both the terminals of the resistor R6 is lowered, so that the output voltage of the comparing amplifier 72 becomes higher than the defined voltage; the particular one of the zener diodes ZD4 to ZD7, which is connected to the LED whose cathode side is grounded, becomes conductive such that the output voltage of the switching regulator 22 is in a normal condition, the capacitor C5 is charged via the conducting one of the zener diodes ZD4 to ZD7. When the voltage between both the terminals of the capacitor C5 exceeds the threshold value of the NPN transistor 80, it is assumed that the time frame during which the abnormal condition occurs due to the grounding failure exceeds the second time, and the NPN transistor 80 is turned ON. The output terminal t2 of the output voltage control circuit 52 is grounded via the NPN transistor 80, so that the operation of the switching regulator 22 is immediately stopped. As a result, the protection control operation with respect to the abnormal condition caused by the grounding failure is carried out faster than the protection control operation for the abnormal operation caused by the disconnection of the LEDs 14 to 20, so that such a sound LED among the LEDs 14 to 20 can be protected.

In this embodiment, the gate voltage of the NMOS transistor 70 is fed back to the input terminals t3 to t6 of the output voltage control circuit 52. Instead of this feedback method, the output signal of the comparing amplifier 72 may be fed back to the input terminals t3 to t6 of the output voltage control circuit 52. In other words, any signals may be utilized if these signals indicate an ON state of the NMOS transistor 70.

Figure 6:
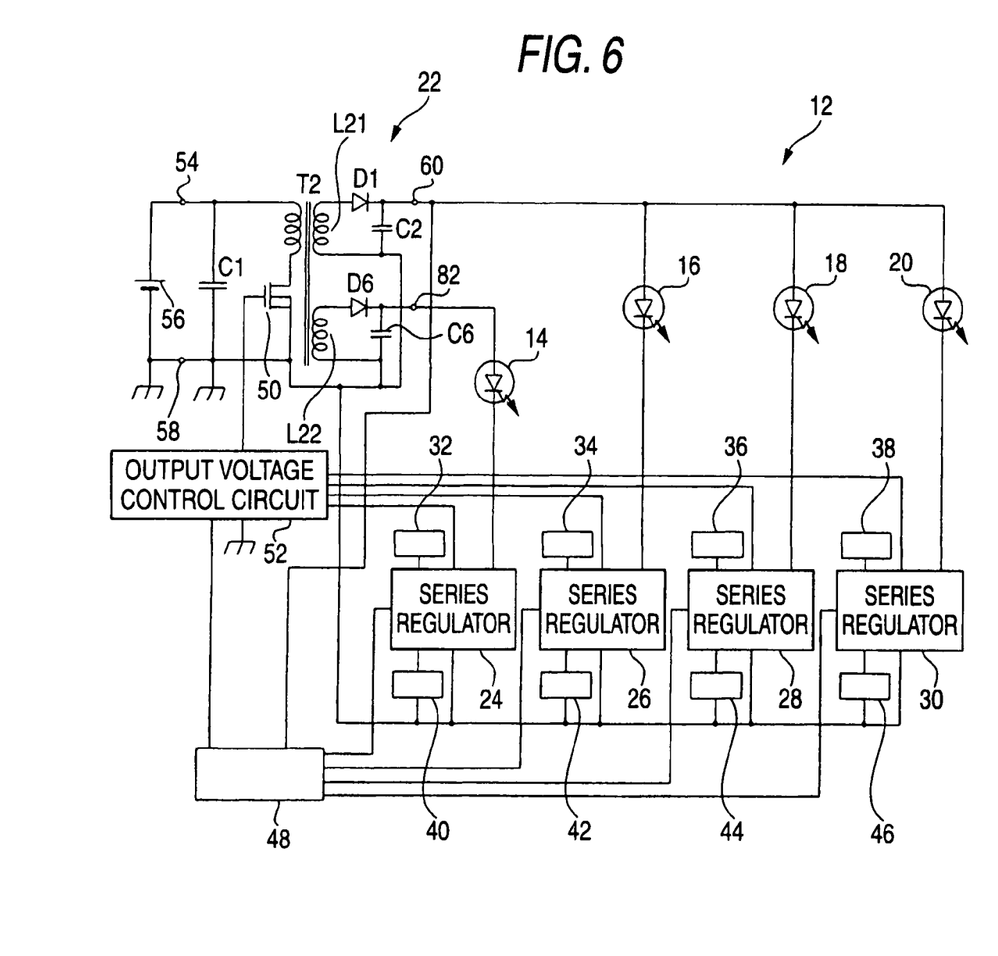
FIG. 6 is a circuit arrangement diagram for a lighting control apparatus of a vehicle-purpose lighting device according to a second embodiment of the present invention.

Next, a second embodiment of the present invention is explained with reference to FIG. 6. In this embodiment, instead of the transformer T1, a transformer T2 having a plurality of secondary windings L21 and L22 is employed. A ratio of turn numbers of the respective secondary windings L21 and L22 is set to correspond to a ratio of voltage drops (forward direction voltages) of LEDs 16, 18, 20, which are connected to the respective secondary windings L21 and L22. Other aspects of the lighting control apparatus of the vehicle-purpose lighting device are similar to those of FIG. 1.

A capacitor C2 is connected via a diode D1 to the secondary winding L22 of the transformer T1, and the LEDs 16, 18, 20 are connected to an output terminal 60. A capacitor C6 is connected via a diode D6 to the secondary winding L22 of the transformer T1 in a parallel manner. A junction point between the diode D6 and the capacitor C6 is connected to another output terminal 82, and the output terminal 82 is connected to the LED 14. Then, assuming now that a forward direction voltage "Vf" of the LED 14 is 8 V and a forward direction voltage Vf as to each of the LEDs 16, 18, 20 is 16 V, the winding ratio of the secondary winding L22 to the secondary winding L21 is set to 1:2.

When the foregoing arrangement is employed, even if the LEDs 14 to 20 whose forward direction voltages Vf are different from each other are connected to the secondary side of the transformer T, voltages responding to the forward direction voltages Vf are provided from the respective secondary windings L21 and L22, so that losses (power losses) can be reduced.

In the respective embodiments, a regulator using the flyback-type regulator has been described as the switching regulator 22. The present invention also may be applied to a forward type regulator and other types of regulators.

What is claimed is:

1. A lighting control apparatus of a vehicle-purpose lighting device comprising:
    a plurality of semiconductor light sources connected in parallel to each other and employed as a load;
    a switching regulator for applying an input voltage from a power supply to the respective semiconductor light sources;
    a plurality of series regulators which are connected in series to the respective semiconductor light sources;
    and protection control means for performing a protection control operation with respect to the respective series regulators in response to an abnormal condition caused by a disconnection as to each of the semiconductor light sources, or by a disconnection as to a circuit coupled to each of the semiconductor light sources;
    wherein each of the series regulators is implemented by a current detecting element for detecting a current of each of the semiconductor light sources, a switch element connected in series to each of the semiconductor light sources, and respective comparators for comparing a current detected by the current detecting element with a defined value and for controlling ON/OFF operations of the switch element in response to a comparison result;
    and wherein the switching regulator controls an output voltage in response to a comparison result of any of said comparators;
    and wherein, when the detected current of each of the current detecting elements is lowered so that a comparison result of the comparator becomes abnormal, each of the protection control means turns OFF the switch element and maintains the OFF operation of the switch element.

2. A lighting control apparatus of a vehicle-purpose lighting device as claimed in claim 1 wherein:
    the switching regulator stores the input voltage of the power supply into a transformer as electromagnetic energy when a main switch is turned ON, or OFF, and discharges the electromagnetic energy stored in the transformer from a secondary side of the transformer to each of the semiconductor light sources when the main switch is turned ON, or OFF; and wherein the transformer is equipped with a plurality of secondary windings, a ratio of turn numbers of the secondary windings is set in correspondence with a ratio of voltage drops of semiconductor light sources connected to the respective secondary windings.

3. A lighting control apparatus of a vehicle-purpose lighting device comprising:
    a plurality of semiconductor light sources connected in parallel to each other and employed as a load;
    a switching regulator for applying an input voltage from a power supply to the respective semiconductor light sources;
    a plurality of series regulators which are connected in series to respective semiconductor light sources;
    and a plurality of voltage drop detecting means for detecting whether applied voltages of the respective switch elements of the series regulators are increased higher than a defined voltage in conjunction with voltage drops of the respective semiconductor light sources;
    wherein each of the series regulators is implemented by a current detecting element for detecting a current of each of the semiconductor light sources, a switch element connected in series to each of the semiconductor light sources, and a comparator for comparing a current detected by the current detecting element with a defined value and for controlling ON/OFF operations of the switch element in response to a comparison result;

wherein the switching regulator controls an output voltage in response to a comparison result of any of the comparators;

and wherein, when a detected output of each of the voltage drop detecting means is added to the detected current of each of the current detecting elements, each of the comparators lowers a current of the switch element in response to an increased voltage.

4. A lighting control apparatus of a vehicle-purpose lighting device as claimed in claim 3 wherein:

the switching regulator stores the input voltage of the power supply into a transformer as electromagnetic energy when a main switch is turned ON, or OFF, and discharges the electromagnetic energy stored in the transformer from a secondary side of the transformer to each of the semiconductor light sources when the main switch is turned ON, or OFF; and wherein the transformer is equipped with a plurality of secondary windings, a ratio of turn numbers of the secondary windings is set in correspondence with a ratio of voltage drops of semiconductor light sources connected to the respective secondary windings.

5. A lighting control apparatus of a vehicle-purpose lighting device comprising:

a plurality of semiconductor light sources connected in parallel to each other and employed as a load;

a switching regulator for applying an input voltage from a power supply to the respective semiconductor light sources;

a plurality of series regulators which are connected in series to the respective semiconductor light sources; and switching regulator control means for performing a control operation with respect to the switching regulator in response to an abnormal operation which is caused by a grounding failure of each of the semiconductor light sources;

wherein each of the series regulators is implemented by a current detecting element for detecting a current of each of the semiconductor light sources, a switch element connected in series to each of the semiconductor light sources, and a comparator for comparing a current detected by the current detecting element with a defined value and for controlling ON/OFF operations of the switch element in response to a comparison result;

wherein the switching regulator controls an output voltage in response to a comparison result of any of the comparators;

and wherein the switching regulator control means stops the operation of the switching regulator so that an output voltage of the switching regulator is in a normal condition when the detected current of each of the current detecting elements is lowered so that a comparison result of the comparator becomes abnormal.

6. A lighting control apparatus of a vehicle-purpose lighting device as claimed in claim 5 wherein;

the switching regulator stores the input voltage of the power supply into a transformer as electromagnetic energy when a main switch is turned ON, or OFF, and discharges the electromagnetic energy stored in the transformer from a secondary side of the transformer to each of the semiconductor light sources when the main switch is turned ON, or OFF; and wherein the transformer is equipped with a plurality of secondary windings, a ratio of turn numbers of the secondary windings is set in correspondence with a ratio of voltage drops of semiconductor light sources connected to the respective secondary windings.

7. A lighting control apparatus of a vehicle-purpose lighting device comprising:

a plurality of semiconductor light sources connected in parallel to each other and employed as a load;

a switching regulator for applying an input voltage from a power supply to the respective semiconductor light sources;

a plurality of series regulators which are connected in series to the respective semiconductor light sources;

protection control means for performing a protection control operation with respect to the respective series regulators in response to an abnormal condition caused by a disconnection as to each of the semiconductor light sources, or a circuit coupled to each of the semiconductor light sources; and switching regulator control means for performing a control operation with respect to the switching regulator in response to an abnormal operation which is caused by a grounding failure of each of the semiconductor light sources;

wherein each of the series regulators is implemented by a current detecting element for detecting a current of each of the semiconductor light sources, a switch element series-connected to each of the semiconductor light sources, and a comparator for comparing a current detected by the current detecting element with a defined value and for controlling ON/OFF operations of the switch element in response to a comparison result;

wherein the switching regulator controls an output voltage in response to a comparison result of any of the comparators;

wherein each of the protection control means turns OFF the switch element and holds the OFF operation of the switch element if a period during which the comparison result of the comparator becomes abnormal in conjunction with lowering of the detected current of each of the current detecting elements has exceeded a first time; and wherein the switching regulator control means stops the operation of the switching regulator under so that an output voltage of the switching regulator is under normal condition if a period during which the comparison result of the comparator becomes abnormal in conjunction with lowering of the detected current of each of the current detecting elements has exceeded a second time which is shorter than the first time.

8. A lighting control apparatus of a vehicle-purpose lighting device as claimed in claim 7 wherein:

the switching regulator stores the input voltage of the power supply into a transformer as electromagnetic energy when a main switch is turned ON, or OFF, and discharges the electromagnetic energy stored in the transformer from a secondary side of the transformer to each of the semiconductor light sources when the main switch is turned ON, or OFF; and wherein the transformer is equipped with a plurality of secondary windings, a ratio of turn numbers of the secondary windings is set in correspondence with a ratio of voltage drops of semiconductor light sources connected to the respective secondary windings.

* * * * *